C. H. OLEY.
SCROLL SAWING-MACHINE.
No. 176,988. Patented May 2, 1876.
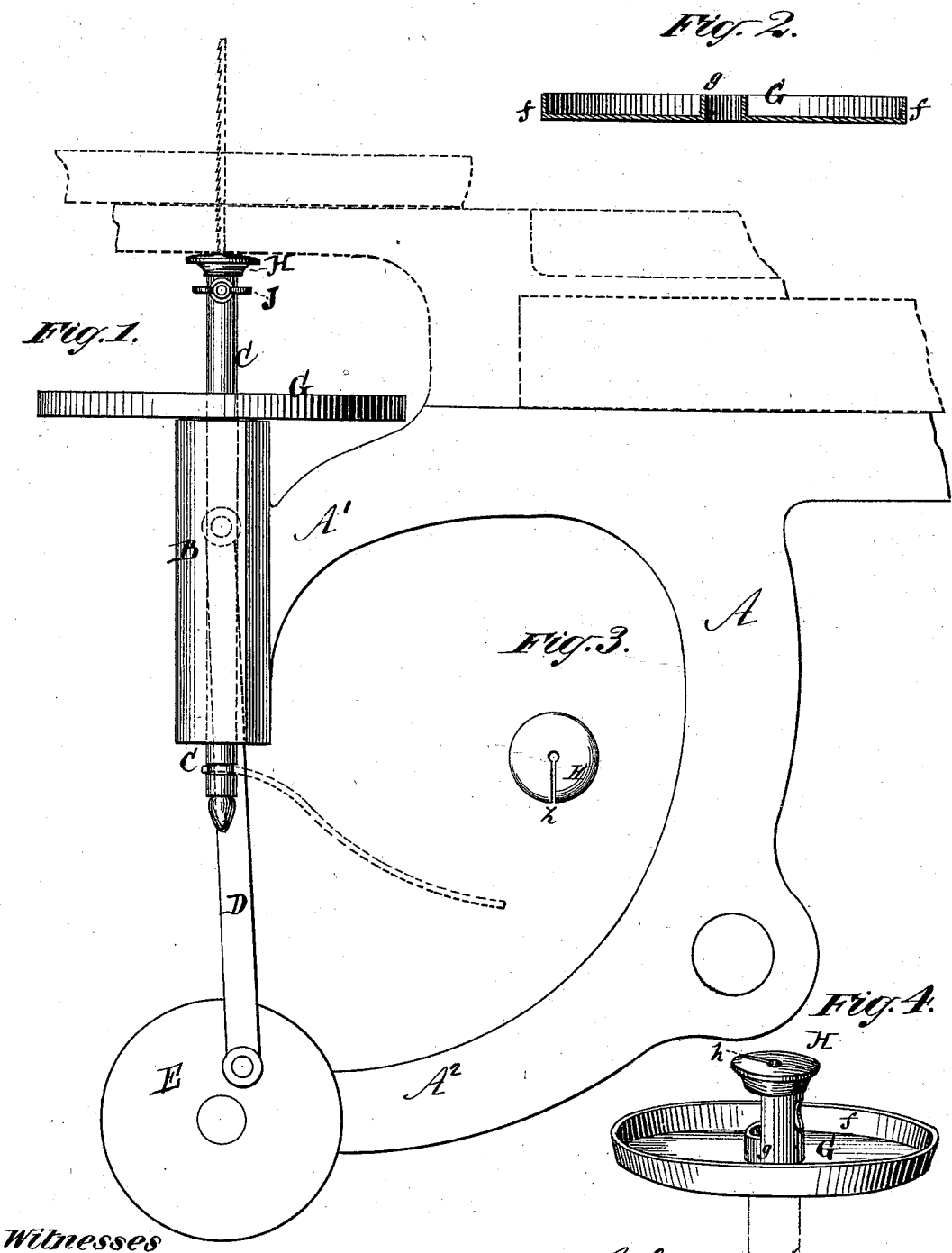

UNITED STATES PATENT OFFICE.

CHARLES H. OLEY, OF BROOKLYN, NEW YORK.

IMPROVEMENT IN SCROLL-SAWING MACHINES.

Specification forming part of Letters Patent No. 176,988, dated May 2, 1876; application filed October 6, 1875.

*To all whom it may concern:*

Be it known that I, CHARLES H. OLEY, of Brooklyn, in the county of Kings and State of New York, have invented an Improvement in Scroll-Sawing Machines; and I do hereby declare that the following is a full, clear, and exact description of the same.

My invention is particularly applicable to a small portable saw, which may be placed upon a table, such as the one for which Letters Patent No. 129,874 were granted to Samuel N. Trump, July 23, 1872, but may be applied to a scroll-saw of any other suitable description.

The object of my invention is to prevent the scattering of sawdust and the clogging of the working parts of the machine thereby.

The invention consists in the combination, with the lower saw-shaft, of a pan of novel construction, working either with or independently of the shaft, and a cap attached to the upper end of said shaft, whereby the sawdust is collected in a mass, and is prevented from clogging the parts or absorbing the oil therefrom.

The pan is made of brass or other suitable material, of a size and strength governed by the character of the machine to which it is to be applied, with a collar in its center for the admission of the saw-spindle. The pan may be attached to, or allowed to rest on, the lower saw-guide, so that the spindle will work freely through the collar; or, it may be attached to the spindle, so as to be carried up and down thereby. The cap is attached to the upper end of the lower saw-spindle, and may be separate from the pan or in one piece with the collar thereof. When the pan rests on, or is attached to, the guide the cap is separate therefrom and attached to the spindle, and when the pan is attached to the spindle so as to move therewith the collar may be extended upward and have the cap formed on, or attached to, its upper end. When the pan rests on the saw-guide it may be provided with springs for holding it in place thereon, and the spindle works easily in the collar, with no perceptible friction. The cap, when separate from the pan, may be placed on the spindle either before or after the saw is inserted, and it fits the spindle tightly, so as to move with it. The cap is provided with a slot for the passage of the saw, which slot may be turned at a right angle to the slot or crevice in the upper end of the spindle or saw clamp, so that the cap will prevent the entrance of sawdust into said crevice, and will shed the dust into the pan below. When the cap is in one piece with, or attached to, the collar an opening is provided in the collar for the insertion and removal of the movable part of the saw-clamp.

In the accompanying drawing, Figure 1 is a side view of a portion of a sawing-machine with my improvements applied thereto. Fig. 2 is a sectional view of the pan. Fig. 3 is a top view of the cap. Fig. 4 is a perspective view of a pan with an extended collar and a cap attached thereto.

The machine, a portion of which is shown, is similar to the one patented by Trump, aforesaid. The lower saw-guide B is attached to an arm, A¹, of the frame A, and in this guide works the lower spindle C, which receives motion through a pitman, D, and a crank-wheel, E, on an arm, A², of the frame A. The pan G is formed with a central collar, *g*, and a peripherical rim, *f*. It rests upon the guide B, so that the spindle C will work freely in the collar, and it may be secured to said guide by springs, or other suitable fastenings, to hold it steadily in place. The cap H is provided with a downwardly-extending rim, enabling it to fit closely on the upper end of the spindle C. The saw-clamp may be formed by a removable semi-cylindrical portion of the spindle, provided with a set-screw, J, passing through the main portion, for holding it in place and clamping the saw. The cap H is provided with a radial slot, *h*, extending from its center to its periphery, so that the cap may be readily put in place or removed while the saw is clamped in position. When the cap is put in place it is turned so as to bring the slot *h* at about a right angle with the crevice in the saw-clamp, and thus prevent the entrance of sawdust into said crevice.

In Fig. 3 of the drawing the cap is represented as being made in one piece with the collar of the pan by extending said collar upward. An opening is left in one side of the collar for the insertion and removal of the movable part of the saw-clamp. When made in this form the pan is attached to and moves with the saw-spindle. In this case, if it is desired to turn the slot at a right angle to the slot or crevice in the spindle, the opening for the set-screw J may be in the form of a bayonet-slot, so as to enable the pan and cap to be turned, and then depressed, so as to cause the collar to fit closely over the top of the spindle and saw clamp.

By means of this invention the sawdust is prevented from absorbing the oil used in lubricating the machine, and, therefore, less frequent oiling is required. It prevents the collection of sawdust on the top of the guide or any other portion of the machine where the parts would be clogged thereby. It collects the sawdust and prevents it from being scattered on the floor, and if said sawdust be worth saving (as in cases where the machine is used for sawing the precious metals, ivory, and certain kinds of wood) the pan provides for the collection and preservation of the same.

What I claim as new, and desire to secure by Letters Patent, is—

The combination of the cap H, the pan G, and the saw-spindle, substantially as herein described.

CHAS. H. OLEY.

Witnesses:
 HENRY T. BROWN,
 MICHAEL RYAN.